(12) United States Patent  
Park

(10) Patent No.: US 8,937,405 B2
(45) Date of Patent: Jan. 20, 2015

(54) DATA CENTER USING FUEL CELLS IN PLACE OF DIESEL GENERATORS FOR BACKUP POWER

(75) Inventor: Seung Hoon Park, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 592 days.

(21) Appl. No.: 12/651,185

(22) Filed: Dec. 31, 2009

(65) Prior Publication Data

US 2011/0156480 A1 Jun. 30, 2011

(51) Int. Cl.
*H02J 9/00* (2006.01)
*G06F 1/30* (2006.01)
*H02J 9/06* (2006.01)
*H02J 1/00* (2006.01)

(52) U.S. Cl.
CPC . *G06F 1/30* (2013.01); *H02J 9/061* (2013.01); *H02J 2001/004* (2013.01)
USPC ............................................. 307/64; 307/66

(58) Field of Classification Search
USPC .................................................... 307/64–66
See application file for complete search history.

(56) References Cited

U.S. PATENT DOCUMENTS

| | | | |
|---|---|---|---|
| 6,787,259 B2 | 9/2004 | Colborn et al. | |
| 7,119,458 B2 * | 10/2006 | Barnes et al. | 307/65 |
| 7,240,492 B2 * | 7/2007 | Johnson | 60/649 |
| 7,250,231 B2 * | 7/2007 | Edlund | 307/66 |
| 7,378,165 B2 | 5/2008 | Brignone et al. | |
| 7,589,436 B2 * | 9/2009 | Takahashi et al. | 307/66 |
| 2002/0134098 A1 * | 9/2002 | Feeney | 62/259.2 |
| 2003/0023888 A1 * | 1/2003 | Smith et al. | 713/300 |
| 2005/0134239 A1 * | 6/2005 | Harris et al. | 323/210 |
| 2005/0200205 A1 | 9/2005 | Winn et al. | |
| 2006/0267411 A1 * | 11/2006 | Farmer | 307/66 |
| 2007/0030650 A1 | 2/2007 | Madara et al. | |
| 2007/0057510 A1 * | 3/2007 | Meyers et al. | 290/1 A |
| 2007/0132317 A1 * | 6/2007 | Willets et al. | 307/66 |
| 2007/0152506 A1 * | 7/2007 | Meyers et al. | 307/66 |
| 2007/0200435 A1 * | 8/2007 | Willets et al. | 307/66 |
| 2007/0217125 A1 * | 9/2007 | Johnson | 361/600 |

OTHER PUBLICATIONS

PCT International Search Report and Written Opinion, PCT Application No. PCT/US2010/059909, Feb. 9, 2011, thirteen pages.

* cited by examiner

*Primary Examiner* — Frtiz M Fleming
(74) *Attorney, Agent, or Firm* — Fenwick & West LLP

(57) ABSTRACT

The need for backup diesel generators in a data center is obviated by using fuel cells to convert a fuel to electrical energy, which provide backup power to equipment in a data center, which may include the servers in the data center and other important systems that normally use utility power. When the utility power fails, the equipment switches to backup power that is provided by fuel cells supplied with fuel (such as natural gas), possibly using a source of temporary power (e.g., a UPS or direct tie-in of batteries) while the fuel cells come online. The fuel may also be used to power a turbine or generator, coupled to a chiller for providing a cooled liquid to a cooling system.

26 Claims, 3 Drawing Sheets

DATA CENTER USING FUEL CELLS IN PLACE OF DIESEL GENERATORS FOR BACKUP POWER

BACKGROUND

This invention relates generally to data centers, and more particularly to providing backup power to the servers and/or other critical systems in a data center.

Organizations often employ data centers to manage their data processing and other computing needs. A data center typically houses many racks of servers, which together perform the processing tasks that a single machine could not. The role of a data center is often critical to an organization, and downtime of a data center can result in severe consequences to the organization and to others who rely on the data center. Since power failures are not uncommon, data centers use power backup systems to deal with interruptions in the supply of power from utility services, which would otherwise result in downtime.

When the utility power goes down, a data center typically uses a power backup system to provide emergency power to computing and other critical resources, such as cooling systems (e.g., an HVAC and chillers). In a typical data center, the backup power is provided by a combination of diesel generators and an uninterrupted power supply (UPS). The UPS is placed between an input power terminal from a utility service and one or more power distribution units (PDUs) in the data center, to which the servers are connected. When the utility power is functioning properly, the UPS uses a portion of the utility power to charge a battery within the UPS, and the majority of the remaining power from the utility service is passed along for use by the data center site. When an interruption in the utility power occurs, the UPS provides temporary backup power to the site for a sufficient period of time to allow the diesel generators to be turned on (typically, 8 to 10 seconds). Once the diesel generators have started, they produce electrical power for the site until normal utility power is reestablished.

A principal drawback of the design of a standard data center is the use of diesel generators. There are many problems with diesel power, both economic and environmental. For example, a substantial number of generators and a large diesel fuel store are required to power a typical data center. Therefore, diesel power generation involves substantial expenditures for generators, fuel stores (which require a polishing system to keep the fuel from being contaminated), and maintenance of this equipment. In addition to economic concerns, there are environmental drawbacks (which also result in further economic expenditures), such as diesel emissions compliance, permits, fire codes with respect to the fuel stores, fumes contaminating the data center, etc.

Accordingly, it would be desirable to provide a backup power system for data centers that reduces or eliminates the need for diesel generators to supply backup power to one or more of the systems in a data center that require power.

SUMMARY

Embodiments of the invention obviate the need for diesel generators to provide backup power in a data center by using fuel cells to convert a fuel (such as natural gas) to electrical energy. The combination of the fuel and fuel cells thus provides backup power to equipment in a data center, which may include the servers in the data center, as well as other important systems, such as cooling systems (e.g., HVAC and chillers), monitoring systems, control systems, and any other systems in a data center that normally use utility power. In this way, diesel generators are not required and can be eliminated, partially or altogether, from the design of a data center.

In one embodiment, the equipment in a data center is normally powered by AC electrical power provided by a utility. Upon failure of this utility power, the equipment in the data center is switched to backup power that is provided by fuel cells supplied with a fuel. The DC power generated by the fuel cells may be provided directly to the equipment and/or can be converted to AC power (e.g., using an inverter) and then provided to the equipment in the data center that uses AC power. As a further backup, a source of fuel may also be used to power a turbine or generator, which is coupled to a chiller for providing cold water (or other liquid) to a cooling system, such as an HVAC evaporative cooling system.

In one embodiment, the data center is configured so that fans external to the servers normally cause the cooling airflow through the servers, and the fans internal to the servers generally do not operate during normal conditions. Upon failure of the utility power, the external fans may be shut off, and the internal server fans are used to provide the primary airflow through the servers to cool their components. This avoids the need for at least a backup power system to keep the external fans operating during a failure of utility power.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
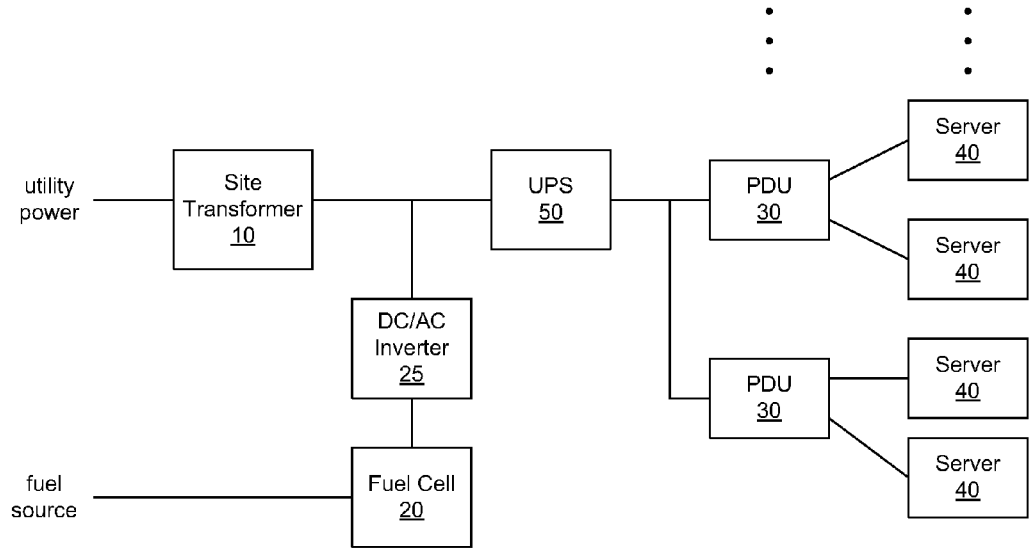
FIG. 1 is a schematic drawing of a system for providing utility and backup power to a plurality of servers in a data center, in accordance with one embodiment of the invention.

FIG. 1 illustrates an example electrical system for providing power to a number of servers 40 located at a site, such as a data center. As used herein, a server 40 (or server computer) is any hardware device that is designed to provide computing services to clients, usually in conjunction with appropriate software installed on the server. Therefore, the techniques disclosed herein may be used to provide power to any kind of hardware devices that rely on electrical power from a power utility service and are thus subject to the dangers of occasional power outages. In a data center, the equipment that may be backed up using techniques described herein may include the servers as well as other systems in the data center, such as cooling systems (e.g., the HVAC and chillers), monitoring systems, control systems, and any other systems in a data center that normally use utility power.

Since the power provided by the utility service may suffer from occasional interruptions, a data center typically employs a backup power system. FIG. 1 illustrates a backup power system for a data center in which the diesel generators used in a typical data center are replaced with one or more fuel cells 20. Under normal operation, where the power from the electrical utility service is operational, the data center receives the utility power from the service at a site transformer 10. The site transformer 10 is coupled to an uninterrupted power supply (UPS) 50, which is coupled to one or more power distribution units (PDUs) 30, to which the servers 40 are connected. When the utility power is functioning properly, the UPS 50 uses a portion of the utility power to charge a battery within the UPS 50, and the majority of the remaining power from the utility service is passed along to the PDUs 30 for use by the servers 40 and any other equipment coupled to the PDUs 30.

Upon failure of the utility power, the fuel cells 20 are activated and begin to provide a source of backup electrical power for the data center. As is known, a fuel cell 20 generates electricity from a reaction between a fuel and an oxidant, which creates a voltage across a pair of electrodes and causes a DC current to flow through a circuit coupled to the electrodes. A fuel cell 20 can generate a continuous source of DC power if the fuel is continuously supplied to it while the products of the reaction are removed. Although the figures and some described herein refer to fuel cells 20 that convert natural gas into electricity, other types of fuels (such as hydrogen) may be used, depending on the design of the particular fuel cell 20.

Since the fuel cells 20 provide DC power, the fuel cells 20 in the configuration shown in FIG. 1 are coupled to the UPS 50 by a DC/AC inverter 25, which converts the DC power from the fuel cell to AC power. This conversion is needed in this configuration since the electrical power form the fuel cells 20 are being supplied via the same path that the AC utility power is supplied. It can be appreciated that this configuration leads to several inefficiencies, since the AC power is converted back into DC power by the UPS 50 (for charging its internal batteries) and by the power supplies of the servers 40. Nevertheless, this embodiment provides a simple method for avoiding diesel generators without requiring substantial modifications of the data center design. Accordingly, it may be a useful and cheap retrofit for existing data centers.

Figure 2:
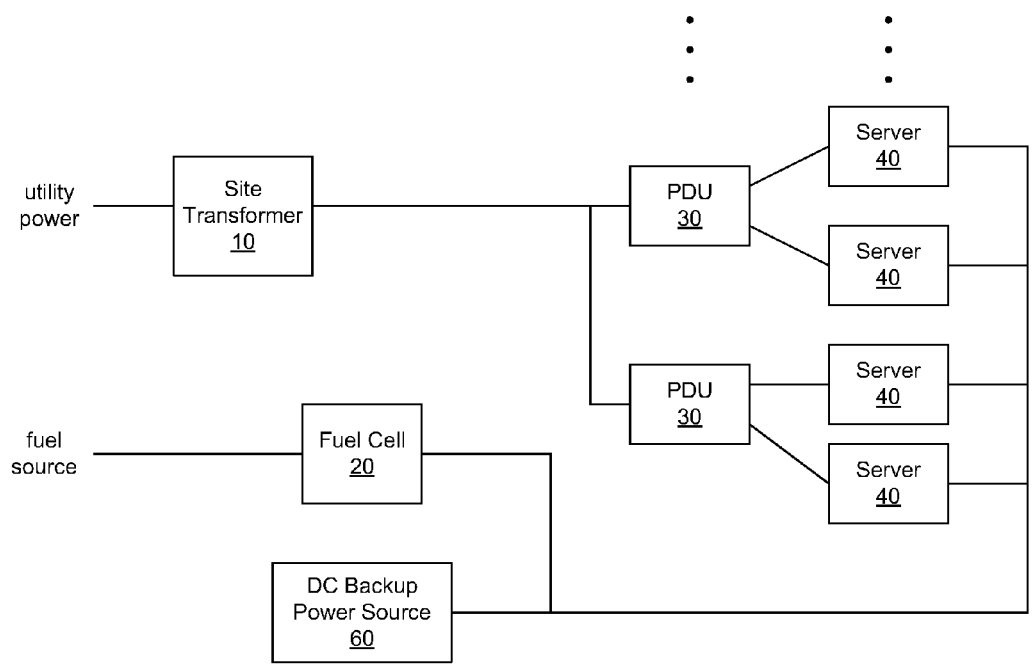
FIG. 2 is a schematic drawing of a system for providing utility and backup power to a plurality of servers in a data center, in accordance with another embodiment of the invention.

FIG. 2 illustrates another embodiment for providing power to the equipment in a data center. In this configuration, the fuel cells 20 are coupled to provide DC power directly to the servers 40, without needing to be converted to AC power only to be converted back to DC power by the servers 40. Accordingly, this configuration may be more efficient, although it may also require modification to the servers 40 and/or other equipment in the data center to allow the equipment to receive the DC power and switch to the DC backup when the utility power fails. One system for receiving DC backup power from the fuel cells 20 and switching to the DC backup power upon failure of utility power is described below in connection with FIG. 3.

Since the fuel cells 20 may require some brief time to start up, the data center may continue to use a UPS to provide this temporary power, as illustrated in FIG. 1, even the fuel cells 20 are coupled directly to the servers 40, as shown in FIG. 2. In the embodiment illustrated in FIG. 2, however, the system uses a DC backup power source 60 instead of a UPS to provide temporary power to the servers 40 while the fuel cells 20 are starting up. In this embodiment, the DC backup power source 60 is coupled to supply DC power to the servers 40. While the fuel cells 20 are starting up in response to a failure of the utility power, the backup power source 60 provides DC electrical power directly to the servers 40. This obviates the need for a UPS, which may lead to inefficiencies in the design of the data center. Embodiments of systems that use a DC backup power source 60 are described in U.S. patent application Ser. No. 12/509,349, filed Jul. 24, 2009, which is incorporated by reference in its entirety. In this embodiment, since the DC backup power source 60 is already coupled to provide DC power to the servers 40, the fuel cells 20 may be more conveniently coupled to the existing connections for also providing DC power to the servers.

Figure 3:
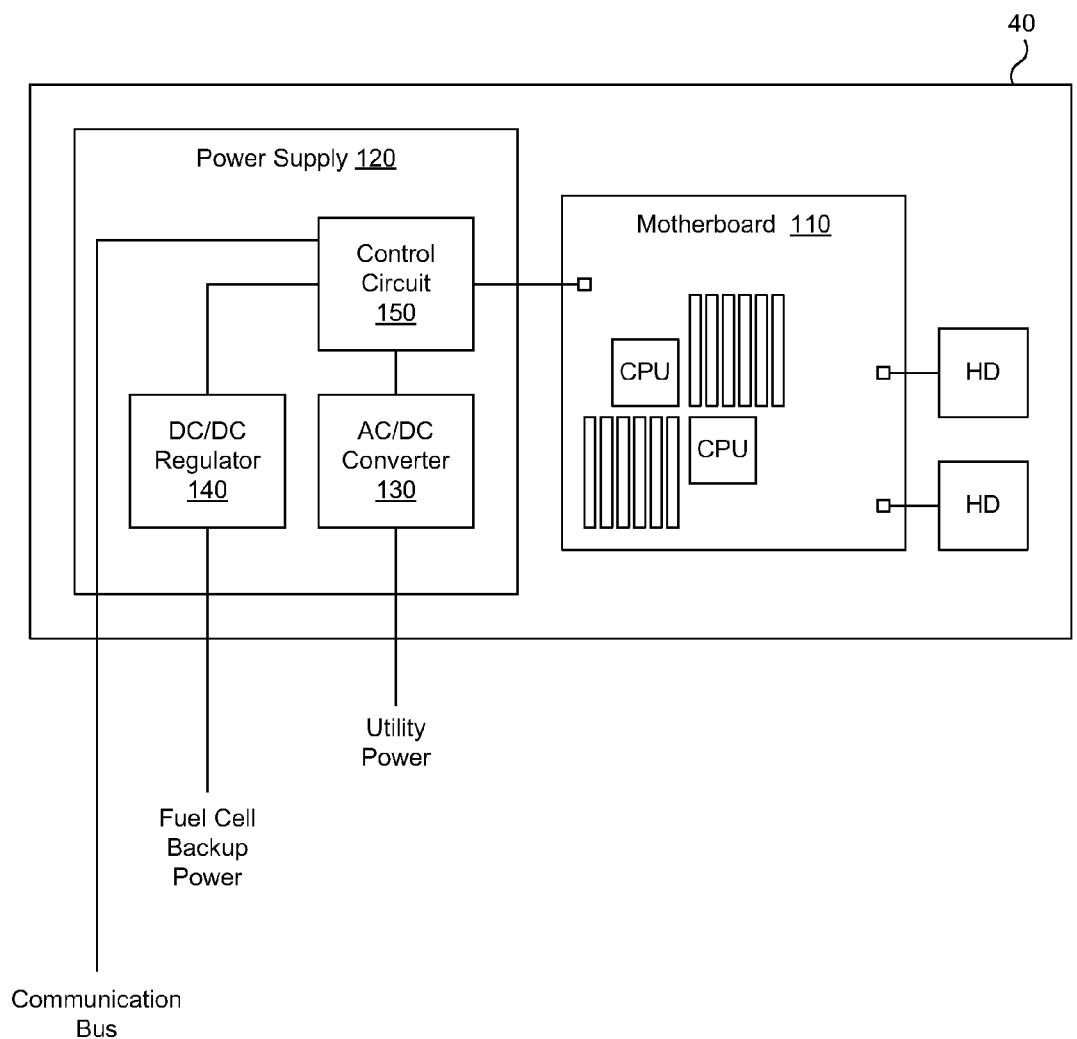
FIG. 3 is a schematic drawing of a server configured to receive backup DC power from a fuel cell, such as in the system illustrated in FIG. 2, in accordance with an embodiment of the invention.

FIG. 3 illustrates a server system that receives both AC utility power and DC backup power from the fuel cells 20. In a typical data center, multiple servers are deployed in a rack-mounted system, where each of a plurality of racks contains a plurality of servers 40. The rack provides a mechanical interface for the servers 40, which are fixed in place by the rack. The rack also provides an electrical interface for the servers 40, including power lines and communication buses. In one embodiment, the rack includes a plug that is connected to an AC power source, such as a PDU 30 at the site. The plug is coupled to a conductor that runs along the rack, making electrical contact with each installed server 40 and thereby providing AC electrical power to each of the servers 40. The rack also includes an electrical conductor for providing DC electrical power from the fuel cells 20.

Figure 4:
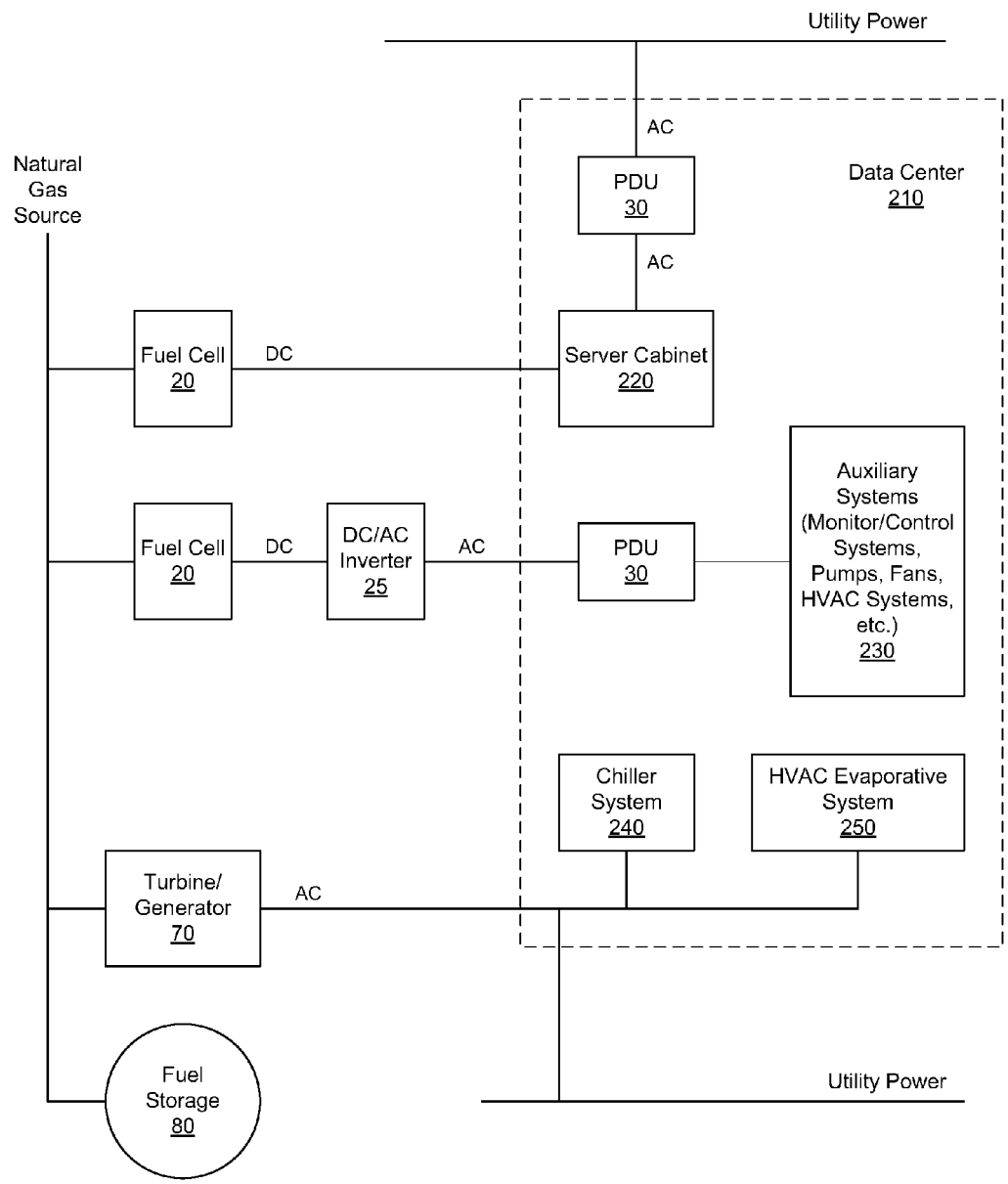
FIG. 4 is a schematic drawing of a system for providing backup power to the various components in a data center, in accordance with an embodiment of the invention.

FIG. 4 illustrates one embodiment of a server 40, which typically includes at least one motherboard 110 and a power supply 120. The motherboard 110 may include standard electrical components, such as CPUs, memory, and other circuitry, and the motherboard may be connected to other auxiliary devices, such as hard drives and other peripherals. The power supply 120 comprises an AC/DC converter 130 that is coupled to the input AC power source to receive utility power. The AC/DC converter 130 converts the AC power into one or more different DC voltages for use by the electrical components on the motherboard 110. The power supply 120 also comprises a DC/DC regulator 140 that is coupled to the DC backup power from the fuel cells 20. The DC/DC regulator 140 may convert the DC power from the fuel cells 20 to one or more different DC voltages as required by the motherboard 110. In an embodiment in which the fuel cells 20 provide the DC voltages needed by the motherboard 110, the DC/DC regulator 140 may be eliminated. Although the DC/DC regulator 140 is shown as a separate component, this functionality may be incorporated into circuitry on the motherboard 110, it may be incorporated into the power supply 120, or it may be provided by a device outside of the server 40. Moreover, one power supply 120 may serve multiple servers 40, or multiple power supplies 120 may be used for a single server 40.

The power supply 120 also comprises a control circuit 150, which is coupled to the AC/DC converter 130 to receive electrical power from the utility, and is coupled to the DC/DC regulator 140 to receive backup power from the fuel cells 20. The control circuit 150 is coupled to one or more power lines on the motherboard 110 and configured to output power of the appropriate voltages to those power lines. During normal operation, while the utility power is operational, the control circuit draws the power from the AC/DC converter 130, thereby using the utility power. The control circuit 150 is further configured to detect a drop in voltage from the utility power that indicates a failure of the utility power. In one embodiment, the control circuit 150 determines that a failure of the utility power has occurred when the voltage drops below a threshold. In another embodiment, the control circuit 150 is coupled to receive a control signal (e.g., from a communication bus) indicating that the utility power has failed.

Upon failure of the utility power, the control circuit 150 switches to draw power from the DC/DC regulator 140, thereby using the backup power provided by the fuel cells 20.

The fuel cells 20 are coupled to receive an indication that the utility powered has failed (e.g., from the control circuit 150, from a UPS, or from some other system in the data center), and in response to this indication are configured to activate themselves. Accordingly, in an embodiment where the DC backup power source 60 is used, the power is actually being provided by the DC backup power source 60 for a brief period of time while the fuel cells 20 are coming online. Similarly, in an embodiment where a UPS is used, the power is being provided by the UPS. In one embodiment, the control circuit is configured to receive a message (e.g., via the communication bus) that the fuel cells 20 are operational, in response to which the control circuit 150 may switch the power to the backup source. Depending on the design of the data center, a number of variations of the switching are possible.

The control circuit 150 may perform other functions as well. For example, the control circuit 140 measures the voltage from the DC/DC regulator 140. This allows the control circuit to determine if the voltage of the backup power source 60 is too low (e.g., when the fuel cells 20 are not operating, the voltage is due to the backup power source 60), which may occur if the charge in the batteries in the backup power source 60 is low. In another embodiment, the control circuit 150 includes a control line to the DC/DC regulator 140, which allows the control circuit to turn on or off the DC/DC regulator 140. In an off mode, the DC/DC regulator 140 may prevent power from being transferred through it. In one embodiment, while the utility power is working under normal conditions, the control circuit 150 disconnects the backup power source 60 from the motherboard 110 by disabling the DC/DC regulator 140. Beneficially, this may prevent backflow of current from the main power supply 120 into the backup power source 60.

In another embodiment, the control circuit 150 is coupled to a central monitoring system, e.g., using the communication bus to carry data over a local network. The control circuit 150 may collect data about the operation of the server 40, the backup power source 60, and/or the fuel cells 20, and then report that information back to the central monitoring system. The reported information may include the reporting of times when the backup power is invoked. The control circuit 150 may also report diagnostics about the fuel cells 20 and/or backup power source 60, enabling system operators to determine more easily when to replace, service, or recharge the equipment.

FIG. 4 illustrates a data center 210 that includes, in addition to servers 40, other important systems in a data center 210 that normally use utility power. In the example shown, the data center 210 comprises one or more server cabinets 220, which may contain rack-mounted servers 40 for performing the computing needs of a business enterprise. As explained above, the servers 40 in the server cabinet 220 are coupled to receive utility power as AC power via one or more PDUs 30 in the data center 210. In one embodiment, the servers 40 are also coupled to receive backup power as DC power from one or more fuel cells 20, which are provided a fuel source. The severs are configured to draw power from the backup source upon failure of the utility power, as explained above.

The data center 210 also includes various auxiliary systems 230, such as monitoring systems, control systems, components of cooling systems (e.g., fans and pumps), and other systems that normally use utility power. Many of these systems are configured to run on AC power, so embodiments of the invention provide these systems with an appropriate source of AC power, even when the fuel cells 20 are used to provide direct DC power to the severs 40. In this example, one or more fuel cells 20 are coupled to a DC/AC inverter 25, which converts DC power from the fuel cells 20 into AC power appropriate for the auxiliary systems 230 in the data center 210 (e.g., 120 Volts at 60 Hertz).

Depending on local weather and other environmental conditions, a data center 210 may require a chiller system 240 to provide cooled liquid (e.g., water) to the cooling systems. The chiller system 240 may comprise a chiller, a cooling tower, and various other mechanical components for generating and storing cooled liquid for use by the cooling systems in the data center 210. In existing data centers, components of the chiller systems may be driven by turbines that are fueled by the diesel fuel that is also used to run the diesel generators. In one embodiment, the data center 210 also includes an HVAC evaporative system 250, which similarly may be powered by turbines that are fueled by the diesel fuel. In one embodiment, since the need for diesel generators is obviated, it is undesirable to have other systems that require diesel fuel. Accordingly, as illustrated, an embodiment of the invention uses a turbine or generator 70 that burns the same fuel used for the fuel cells 20. This may allow the data center to avoid the use of diesel fuel altogether.

In one embodiment, the system further comprises a fuel storage system 80 configured to receive the fuel (e.g., natural gas) from a utility, and also configured to provide the fuel to the fuel cells 20 and/or turbine or generator 70 as needed. In this way, the data center is also protected from temporary failures of the fuel provider, which may also be a utility service.

In one embodiment, the data center 210 is configured to cool the servers 40 using an airflow that is primarily caused by fans that are external to the servers 40. In this embodiment, under targeted normal operating conditions, the internal server fans need not operate for a sufficiently cooling airflow to exist, since the external fans are arranged to generate a higher air pressure on one side of the servers (the "cold aisle") and a resulting lower air pressure on the other side of the servers (the "hot aisle"). Embodiments of systems that provide a cooling airflow through the servers 40 using external fans are described in U.S. patent application Ser. No. 12/628,143, filed Nov. 30, 2009, which is incorporated by reference in its entirety.

The use of external fans may help save energy during normal operating conditions, since the fewer large external fans are more efficient than the smaller internal fans. However, the large external fans also need backup power when the utility power fails. Accordingly, in one embodiment, the need to provide a backup power system to the external fans is obviated by configuring the internal fans of the servers so that they operate like standard internal server fans upon a utility power failure. This may be achieved by providing a signal that indicates the existence of a power failure and by programming the BIOS of the servers, as explained in U.S. patent application Ser. No. 12/628,143, so that they provide sufficient cooling airflow by themselves to cool the servers without help from an external fan. In another embodiment, the server fans are configured to activate once the servers reach a threshold temperature, thereby providing an inherent backup to the external fans. In this embodiment, no reprogramming of the servers is needed, since the internal fans will automatically kick in regardless of the cause of the higher temperature (e.g., due to failure of the external fans).

Embodiments of the invention have been disclosed in terms of using the fuel cells 20 as a backup power system for the data center 210, in the event that electrical power form a utility service fails. In other embodiments, however, the data center 210 may use the fuel cells 20 as a primary source of power, and then use the utility power to back up the fuel cells 20. These embodiments would be simple modifications of any of the embodiments discussed above, but where the control systems are configured to draw power from the fuel cells 20 to the equipment in the data center 210 under normal conditions. When the control systems determine that backup power is needed, the control systems can then switch (fully or partially) to draw power from the utility service. The need to back up the fuel cells 20 might occur upon a number of different occasions, any of which may be called a "failure" of the service. For example, the utility power may be used as a backup upon actual catastrophic failure of the fuel cells 20, or simply whenever the fuels cells 20 are brought down for maintenance, if the fuel source is running low, or for any other reason that an operator of the data center 210 deems it necessary or desirable to switch from the fuel cells 20 to utility power.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A server system comprising:
    a plurality of servers, wherein each of the servers is configured to receive AC power at an AC input of the server and DC power at a DC input of the server;
    an input power terminal coupled to receive AC electrical power from a utility service and further coupled to the AC input of each of a plurality of the servers to provide the AC electrical power from the utility service to the plurality of servers;
    a fuel source configured to provide a fuel;
    a fuel cell coupled to receive the fuel from the fuel source and configured to convert the fuel to DC electrical power, the fuel cell coupled to the DC input of each of a plurality of the servers to provide backup DC power thereto;
    a control system configured to direct the AC electrical power from the utility service to the AC input of the servers during normal operation, and further configured to direct the DC electrical power from the fuel cell to the DC input of the servers upon failure of the utility service;
    a power system coupled to receive the fuel from the fuel source and configured to convert the fuel into power; and
    a chiller system coupled to receive the converted power from the power system and thermally coupled to cool the plurality of servers.

2. The system of claim 1, further comprising:
    an uninterrupted power supply (UPS) coupled between the input power terminal and the AC input of each of the plurality of the servers.

3. The system of claim 1, further comprising:
    a DC backup power source coupled to the DC input of each of the plurality of servers to provide DC power to the servers during a period of time while the fuel cell is starting up.

4. The system of claim 3, wherein the fuel cell is coupled between the DC backup power source and the DC input of each of the plurality of servers to provide DC power directly to the servers.

5. The system of claim 1, wherein one or more of the servers comprise a power supply that is configured to receive the AC power from the utility service and to receive the DC power from the fuel cell, and wherein the control system is a component of the power supply.

6. The system of claim 1, further comprising:
    a DC/AC inverter coupled to the fuel cell and configured to receive DC power from the fuel cell and generate AC power therefrom, the DC/AC inverter coupled to one or more outlets for providing AC power to electrical systems.

7. The system of claim 1, wherein the power system comprises one of a turbine or a generator, and wherein the chiller system is configured to generate cooled liquid and to provide the cooled liquid to a cooling system coupled to the plurality of servers.

8. The system of claim 1, further comprising one or more fans external to the servers that are configured to cause a cooling airflow through the servers, wherein the external fans are coupled to the input power terminal and configured to operate based on power from the utility service, and wherein the servers include internal fans that are configured to generate a cooling airflow through the servers upon failure of the utility service.

9. The system of claim 1, wherein the input power terminal is coupled to provide AC power to each of a plurality of the servers without converting the AC power to DC power, and wherein the fuel cell is coupled to provide DC power the DC input of each of a plurality of the servers without converting the DC power to AC power.

10. The system of claim 1, wherein the input power terminal is coupled to the AC input of each of a plurality of the servers via an AC line, and wherein the fuel cell is coupled to the DC input of each of a plurality of the servers via a DC line.

11. A server system comprising:
    an input power terminal configured to receive AC power from a utility service and to supply the AC power to electrical equipment;
    a fuel source configured to provide a fuel;

one or more fuel cells coupled to receive the fuel from the fuel source and configured to convert the fuel to DC power;

a plurality of servers, each server comprising a motherboard that contains electrical components configured to operate using DC power, and each server comprising an AC input and a DC input, each AC input coupled to the input power terminal to receive the AC power therefrom and to convert the AC power to DC power for the server during normal operation of the utility service, and each DC input coupled to the one or more fuel cells to receive DC power therefrom and to provide DC power from the one or more fuel cells to the server upon failure of the utility service;

a power system coupled to receive the fuel from the fuel source and configured to convert the fuel into power; and a chiller system coupled to receive the converted power from the power system and thermally coupled to cool the plurality of servers.

12. The system of claim 11, further comprising:
a DC backup power source coupled to provide DC power to the DC inputs of the servers during a period of time while the one or more fuel cells are starting up.

13. The system of claim 12, wherein one or more of the fuel cells are coupled between the DC backup power source and the DC inputs of the servers to provide DC power directly to the servers.

14. The system of claim 11, further comprising:
a DC/AC inverter coupled to one or more of the fuel cells and configured to receive DC power from the fuel cells and generate AC power therefrom, the DC/AC inverter coupled to one or more outlets for providing AC power to electrical systems.

15. The system of claim 11, wherein the power system comprises one of a turbine or a generator, and wherein the chiller system is configured to generate cooled liquid and coupled to provide the cooled liquid to a cooling system coupled to the plurality of servers.

16. The system of claim 11, wherein the data center further comprises one or more fans external to the servers that are configured to cause a cooling airflow through the server, wherein the external fans are coupled to the input power terminal and configured to operate based on power from the utility service, and wherein the server includes an internal fan that is configured to generate a cooling airflow through the server upon failure of the utility service.

17. A method comprising:
receiving AC electrical power at a data center from a utility service;
supplying the received AC electrical power to an AC input of each server of a plurality of servers located at the data center;
supplying a fuel from a fuel source to one or more fuel cells and to a power system;
converting the fuel into electrical power by the power system;
supplying the converted electrical power from the power system to a chiller system;
cooling the plurality of servers by the chiller system;
coupling a DC input of each server of the servers to a backup power source, the backup power source comprising the one or more fuel cells configured to convert the fuel to DC electrical power; and
upon failure of the AC electrical power from the utility service, supplying DC electrical power to the servers from the one or more fuel cells.

18. The method of claim 17, further comprising:
activating the one or more fuel cells upon failure of the electrical power; and
providing a temporary power supply to the servers while the fuel cells are starting up.

19. The method of claim 18, wherein providing the temporary power supply to the servers comprises coupling the DC input of each of the servers to an uninterrupted power supply (UPS).

20. The method of claim 18, wherein providing the temporary power supply to the servers comprises coupling the DC input of each server of the servers to a DC backup power source.

21. The method of claim 20, wherein the fuel cells are coupled between the DC backup power source and the DC input of each server of the servers to provide DC power directly to the servers.

22. The method of claim 17, further comprising:
converting DC power from one or more of the fuel cells into AC power;
powering one or more electrical systems in the data center using the converted AC power.

23. The method of claim 17, wherein the power system comprises one of a turbine or a generator, and further comprising:
generating, by the chiller system, a cooled liquid for a cooling system in the data center.

24. The method of claim 17, further comprising:
cooling the servers by generating an airflow through the servers using one or more fans external to the servers that are powered by the power received from the utility service during operation of the utility service; and
cooling the servers by generating an airflow through the servers using internal server fans that are powered by the power supplied to the servers from the one or more fuel cells upon failure of the utility service.

25. A server system comprising:
a plurality of servers, each server comprising an AC input and a DC input;
an input power terminal coupled to receive AC electrical power from a utility service and further coupled to each AC input of the plurality of the servers to provide the AC electrical power from the utility service to the plurality of servers;
a fuel source configured to provide a fuel;
a fuel cell coupled to receive the fuel from the fuel source and configured to convert the fuel to DC electrical power, the fuel cell coupled to each DC input of the plurality of servers to provide DC power thereto;
a control system configured to direct the electrical power from at least one of the utility service and the fuel cell to the servers during normal operation, and further configured to direct the electrical power from either of the utility service or the fuel cell to the servers upon failure of the other;
a power system coupled to receive the fuel from the fuel source and configured to convert the fuel into power; and
a chiller system coupled to receive the converted power from the power system and thermally coupled to cool the plurality of servers.

26. The server system of claim 25, wherein the control system is configured to direct the DC electrical power from the fuel cell to each DC input of the plurality of servers during normal operation, and further configured to direct the AC electrical power from the utility service to each AC input of the plurality of servers upon failure of the fuel cell.

* * * * *